United States Patent
Leidig et al.

(10) Patent No.: US 12,110,917 B2
(45) Date of Patent: Oct. 8, 2024

(54) FASTENING DEVICE

(71) Applicant: ILLINOIS TOOL WORKS INC., Glenview, IL (US)

(72) Inventors: Christoph Leidig, Rothenburg ob der Tauber (DE); Jan Müller, Würzburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 222 days.

(21) Appl. No.: 17/762,612

(22) PCT Filed: Sep. 22, 2020

(86) PCT No.: PCT/US2020/051934
§ 371 (c)(1),
(2) Date: Mar. 22, 2022

(87) PCT Pub. No.: WO2021/067064
PCT Pub. Date: Apr. 8, 2021

(65) Prior Publication Data
US 2022/0397146 A1    Dec. 15, 2022

(30) Foreign Application Priority Data
Oct. 2, 2019   (DE) .................... 10 2019 126 620.3

(51) Int. Cl.
F16B 21/08    (2006.01)
F16B 21/02    (2006.01)

(52) U.S. Cl.
CPC ............ *F16B 21/086* (2013.01); *F16B 21/02* (2013.01); *F16B 21/08* (2013.01)

(58) Field of Classification Search
CPC ........ F16B 21/02; F16B 21/08; F16B 21/084; F16B 21/086; Y10S 411/913
(Continued)

(56) References Cited

U.S. PATENT DOCUMENTS

| 3,986,780 A | 10/1976 | Nivet |
| 4,810,147 A | 3/1989 | Hirohata |

(Continued)

FOREIGN PATENT DOCUMENTS

| CN | 101438065 A | 5/2009 |
| CN | 101566184 A | 10/2009 |

(Continued)

OTHER PUBLICATIONS

PCT, International Search Report and Written Opinion, International Application No. PCT/US2020/051934; date of mailing Dec. 3, 2020, 10 pages.

*Primary Examiner* — Roberta S Delisle
(74) *Attorney, Agent, or Firm* — THOMPSON HINE LLP (57) ABSTRACT

A fastening device for fastening add-on parts on carrier components has a plug-in locking device, for locking to a carrier component, and a releasable rotary locking device, spaced apart axially from the plug-in locking device and intended for locking to an add-on part. The rotary locking device has an axial supporting element and at least one locking wing, spaced apart axially from the supporting element and extending away radially from a shank of the fastening device. The supporting element and the at least one locking wing have axial locking surfaces, located axially opposite one another. The axial locking surface of the supporting element is arranged axially between the locking wing and the plug-in locking device. The rotary locking device also has a rotary locking stop, which delimits the rotating-in and/or rotating-out action.

15 Claims, 9 Drawing Sheets

(58) Field of Classification Search
USPC .......................................... 411/500, 508–510
See application file for complete search history.

(56) References Cited

U.S. PATENT DOCUMENTS

| | | | |
|---|---|---|---|
| 4,981,405 A | 1/1991 | Kato | |
| 5,368,427 A * | 11/1994 | Pfaffinger | F16B 21/04 |
| | | | 24/DIG. 54 |
| 6,305,588 B1 | 10/2001 | Michel | |
| 6,474,921 B1 * | 11/2002 | Gordon | F16B 21/02 |
| | | | 411/509 |
| 6,612,795 B2 * | 9/2003 | Kirchen | F16B 21/02 |
| | | | 24/297 |
| 7,757,997 B2 * | 7/2010 | Smutny | F16B 21/086 |
| | | | 24/453 |
| 8,671,527 B2 * | 3/2014 | Scroggie | F16B 21/082 |
| | | | 24/453 |
| 8,806,722 B2 * | 8/2014 | Iwahara | F16B 21/086 |
| | | | 24/453 |
| 2005/0079033 A1 * | 4/2005 | Benedetti | F16B 21/086 |
| | | | 411/508 |
| 2006/0099051 A1 * | 5/2006 | Moerke | F16B 19/008 |
| | | | 411/508 |
| 2006/0242802 A1 * | 11/2006 | Scroggie | F16B 5/0657 |
| | | | 24/297 |
| 2007/0258795 A1 | 11/2007 | Nakazato | |
| 2008/0066266 A1 * | 3/2008 | Scroggie | B60R 13/0206 |
| | | | 24/297 |
| 2009/0178249 A1 | 7/2009 | Jalbert | |
| 2009/0252573 A1 * | 10/2009 | Nakazato | F16B 21/086 |
| | | | 411/510 |
| 2009/0290932 A1 | 11/2009 | Silbereisen | |
| 2013/0125372 A1 | 5/2013 | Van Niekerk | |
| 2016/0040705 A1 | 2/2016 | Peter | |
| 2017/0002853 A1 | 1/2017 | Huet | |
| 2017/0335877 A1 * | 11/2017 | Steltz | F16B 5/0657 |
| 2019/0032696 A1 | 1/2019 | Sbongk | |

FOREIGN PATENT DOCUMENTS

| | | |
|---|---|---|
| CN | 105102830 A | 11/2015 |
| CN | 109305112 A | 2/2019 |
| CN | 109927798 A | 6/2019 |
| DE | 112014005984 T5 | 10/2016 |
| JP | 2000009117 A | 1/2000 |
| JP | 2000055020 A | 2/2000 |
| JP | 3429202 B2 | 7/2003 |
| JP | 2011043230 A | 3/2011 |
| WO | WO 2004011815 A1 | 2/2004 |
| WO | WO 2007069036 A1 | 6/2007 |
| WO | WO 2014170028 A1 | 10/2014 |
| WO | WO 2018197769 A1 | 11/2018 |

* cited by examiner

FASTENING DEVICE

TECHNICAL FIELD

The invention relates to a fastening means for fastening add-on parts on carrier components.

BACKGROUND

In particular in the case of motor vehicles, it is known for plastic parts such as plastic covers, for example aerodynamically active covers, to be arranged on vehicle-body parts or chassis parts in the region of the underside. In the simplest case, such plastic parts can be arranged on a metal part of a motor vehicle using pins which are formed in one piece with the plastic parts, by for example latching being achieved by way of rear-engagement spring arms. The disadvantage, however, with such configurations is that, in the event of a repair or maintenance, said parts are inevitably destroyed.

In order to overcome this disadvantage, releasable fastening means have been developed. U.S. Pat. No. 6,612,795 B2 discloses a fastening means which has an essentially cylindrical shank on which are formed, adjacent to a free end, resilient restraining arms which, once the fastening means has been plugged through a hole, for example in a panel, spring outwards, and ensure rear engagements, in a manner known per se. In addition, said fastening means has a head, wherein this head is of oval or elongate design in a direction transverse to the longitudinal extent of the shank and has a drive, for example an internal hex drive, in order to be rotatable. Additionally formed on the fastening means is a seal, which is arranged around the shank. It is possible for the head of said fastening means to be put through a correspondingly shaped opening and, as a result of being rotated through a quarter-circle, then to project laterally, on account of the elongate or oval shaping, beyond the opening-delimiting edges, and therefore a first panel, behind which the restraining arms engage, can be connected to a second panel, which is retained by the head.

For removal purposes, it is sufficient here for the head to be rotated anew by a quarter rotation, in which case the shape of the head is aligned with the shape of the plug-through opening of the second panel, and therefore the second panel can be removed. On account of the retaining arms being latched in the first panel, the fastening means remains on the first panel. On the shank, two sealing elements, which are spaced apart from one another, can be arranged to extend radially away from the shank. A first seal here, as a seal for the head, is spaced apart from the head by a panel thickness, whereas a second seal is spaced apart from the free ends of the restraining arms by the distance of approximately a panel thickness, and therefore, in the installed state, the head and the first seal, delimiting a second panel, bear against the latter, preferably with a press fit, and the first seal, interacting with the free, stressed restraining arms, bears against the first panel with a sealing press fit.

U.S. Pat. No. 3,986,780 A likewise discloses a fastening means, in particular one made of plastic, which can connect to plate-like elements. In this case, a shank is formed along a longitudinal axis, wherein a rear-engagement plate is formed at one end of the shank and is spaced apart from a support plate approximately by the thickness of a panel which is to be connected. In order to provide for engagement behind a panel, and to connect the same, the panel contains an elongate, for example, rectangular, opening with long side edges and short side edges. The head of the connecting means has a corresponding shape, wherein the supporting plate has shaped structures, directed toward the head, which correspond in length to the length of the short hole-delimiting edge. These shaped structures are each arranged parallel to a long edge of the head. This makes it possible, once the head, and the rear-engagement plate arranged on the head, has been plugged through, for the fastening element or fastening means to be rotated, wherein, following a quarter rotation, the shaped structures on the supporting panel latch into the opening parallel to the short edges. A comparable arrangement for oval slots is likewise disclosed. Once installation has taken place, a rotation prevention is thus achieved. A cross sectionally square rear-engagement element is formed at the foot of the shank, said rear-engagement element being designed to be pushed into a corresponding hole of square cross section. In addition, restraining arms which spring outward, and engage behind the panel, are formed on the rear-engagement element. Rotation of the fastening means through a quarter-circle additionally results in rear engagement of the corner edges of the square foot.

The fastening means with the aforementioned shapings is suitable here for being secured on correspondingly shaped slots or square holes, wherein it is merely the case hereby that the fastening means is arranged on a panel, but does not connect two panels.

US 2009/01 78 249 A1 discloses a clip connector having, at one end, an essentially conical clip region, which is known per se, with two restraining arms and a resilient abutment plate, by way of which the fastening means can be fastened in a hole, for example in a metal panel, in particular a vehicle-body panel.

In addition, said fastening means has, around a shank, in particular a plurality of wings, for example wings which are also arranged helically around the shank and are intended to be plugged into a correspondingly shaped opening of a foamed component and, following rotation through 90°, to cut into the foam material and engage behind the same. For this purpose, rather than being arranged in a uniformly concentric manner around the shank, the corresponding wings extend for example radially in a direction away from the shank or for example in two diametrically opposite directions and therefore cutting-in and rear-engagement action can take place during the course of a 90° rotation.

WO2014/17 00 28 A1 discloses a connecting element for mechanically connecting two components of a motor vehicle, in particular components of a motor-vehicle door. This connecting element should have a bearing collar for bearing against a first component, having a transverse latch which extends essentially along a longitudinal direction and comprises at least one clamping wedge for clamping the second component against the first component in a rotated definitively fitted state. Additionally present is a shank portion which carries the transverse latch and serves for rotatable guidance through corresponding through-passages in the first component and in the second component. The first component which is to be connected and the second component which is to be connected have mutually corresponding through-passages, which are of irregularly elongate shape. In the fitted state, the bearing collar of the connecting element rests on the first component. An encircling seal is arranged on the rear side of the bearing collar, and said seal both provides tolerance compensation and should perform sealing action.

Additionally arranged on the connecting element are two diametrically arranged clamping wedges, which are arranged on the central shank portion as parts of a transverse latch which extends in a longitudinal direction, i.e. in a direction transverse to a plug-in axis.

The aforementioned connecting means have in common that they are comparatively complex and of complicated construction, which increases the manufacturing outlay. In addition, the aforementioned elements in some cases require openings in metals to be matched specifically to them, in particular openings which have to have relatively narrow tolerances and require the connecting element to be arranged in the correct position.

SUMMARY

The object of the invention is to provide a fastening means (or fastening system or fastening assembly) which is of straightforward construction, is easy to fit, can arrange add-on parts, in particular plastic parts, on carrier components, in particular panel structures, in a reliable and rattle-free manner and, in addition, can be straightforwardly fitted and removed.

The object is achieved by a fastening means having the features of claim 1.

Advantageous developments are characterized in the sub-claims which are dependent on claim 1.

The fastening means according to the invention has a plug-in locking device, for locking to a carrier component, and a releasable rotary locking device, for locking to an add-on part. The rotary locking device has an axial supporting element and at least one locking wing, which is spaced apart axially from the supporting element and extends away radially from a shank of the fastening means. The supporting element and the at least one locking wing have axial locking surfaces, which are located axially opposite one another. The rotary locking device also has a rotary locking stop, which delimits the rotating-in and/or rotating-out action. It is also the case that the locking to the carrier component and the locking to the add-on part are separated from one another in functional terms by axially spaced-apart locking devices, which operate, in one case, with plug-in action, and in the other case, with rotary action. This means that an add-on part and a carrier component can be fitted at a distance from one another. The rotary locking stop can actively prevent over-rotation and resulting release or loosening of the connection to the add-on part.

The opposite axial locking surfaces, which lock the add-on part, can be designed for the greatest possible amount of overlap since the plug-in locking device renders a ramp for locking to the carrier component superfluous, and therefore it is also possible to establish a connection which is particularly secure against tilting.

The plug-in locking device can have at least one preferably elastic latching element and an abutment device, which is spaced apart axially therefrom. The latching element can be formed from the for example cylindrical shank, which can be designed to plug into in particular round holes of the carrier component, for example of a vehicle-body component, the latching element for example being in the form of a radially resilient rear-engagement arm which, once the shank has been plugged through the hole, can spring outward and ensure rear engagement. In order for the shank to be retained reliably in said hole, and in particular in order to avoid rattling, the abutment device can act on the other side of the carrier component by way of a bearing edge. At least one abutment arm which projects radially on the shank can be formed for this purpose, said abutment arm retaining with a press fit, between free ends of the latching elements on the one hand and its own underside on the other hand, a correspondingly gripped carrier component. The abutment arm can be of axially resilient design. It is also possible for an additionally or alternatively provided elastic element to be formed on the bearing edge.

In addition, spaced apart axially therefrom is the rotary locking device having the axial supporting element, which can be designed for example in the form of a carrier plate which encircles the shank, for bearing against an add-on part, for example a plastic part, for instance aerodynamic paneling, which is to be fastened. Said carrier plate can be designed for example in the form of a circular disk.

Spaced apart axially from the supporting element, and in particular spaced apart by the thickness of the material of an element which is to be fastened, the at least one locking wing is arranged to extend away radially from the shank. For reasons relating to symmetrical support, it is advantageous if at least two, for example two, three or four, locking wings are provided. The smaller the number of locking wings, the more stable is the respective region of attachment to the shank and therefore the higher is the bending resistance in this region. Therefore, preferably two locking wings are provided. Locking wings can extend away from the shank in a diametrically opposite manner and be, in particular, in the form of a sector of a circular disk. Therefore, the locking wing or wings is or are preferably delimited in the tangential direction by edges which run essentially radially. Essentially radially preferably means that the progression of the edges deviates by at most ±10°, preferably at most ±5°, in relation to an ideal radial progression. It is preferably possible for the locking wings to terminate on the radially outer side in an axially aligned manner for example with an encircling edge of the supporting element. The base of the locking wings at the shank, or the region of attachment of the locking wings to the shank, is preferably smaller here in each case than a quarter of the circumference of the cylindrical shank. Accordingly, the locking wings widen outwards in the manner of a sector of the circular disk. This results in the formation of a locking contour which is elongate, as seen in relation to the diameter of the shank, and has a large surface area in comparison with the essentially parallel-edged locking wings disclosed in U.S. Pat. No. 6,612,795. In plan view, the locking wings attached to the shank therefore form preferably approximately a butterfly shape or butterfly contour.

The rotary locking device can also restrict the rotating action into a plug-in opening of an add-on part and, during rotating-out action, can prevent over-rotation and thus renewed locking. This can also facilitate fitting and removal to a considerable extent. For example, along a trailing radial edge of the locking wing, as seen in the rotating-in direction, a radial crosspiece can be provided in the space between the supporting element and locking wing. The rotary locking device can also connect the supporting element and the locking wing to one another and thus stiffen the entire structure. The supporting element is preferably arranged at least on the radially outer edge region and/or on an outer edge of the at least one locking wing.

It is additionally possible for the shank to have formed on it, axially and diametrically opposite a plug-in end, a drive end, having a drive, for example an external hex drive or an internal hex drive or a torx drive, so that the fastening means can be rotated using a corresponding tool. If the at least one locking wing, as seen from the support element, is arranged in the direction of the rotary drive, the fastening means can be fitted on a preliminary basis on the add-on part from a rear side of the add-on part while driving takes place from the outside. That portion of the fastening means which follows the rotary fastening device in the direction of the plug-in end, that is to say in the direction of the carrier component, can therefore be designed completely independently of the shape of a fitting opening in the add-on part, and vice versa.

In the case of an advantageous embodiment, the invention provides a locking contour which is designed to interact with a corresponding mating locking contour of an add-on part such that a position of the fastening means in which the add-on part is retained on a carrier component is secured against unintended release or, for example, vibration induced opening.

If, for the locking contour, an appropriate locking track with a corresponding latching step is arranged adjacent to an accommodating opening for the locking contours, adjacent to the shank, the fastening means can be fitted on the preliminary basis on a corresponding add-on part in a manner secured by random rotation.

A fastening means designed in this way is a straightforward construction and can be fitted on a preliminary basis by rotation in a corresponding opening of an add-on part. For a definitive installation, all that is then required is for the shank to be plugged into a corresponding bore in the carrier component, until the latching elements, which are preferably pushed in the first instance radially inward, spring outwards following engagement through the hole and, together with the spring lug or lugs, secure the entire arrangement on the carrier component.

For removal purposes, it is sufficient for the respective fastening means to be rotated by a suitable tool such that the locking contour moves out of latched engagement with the add-on part and is rotated until the locking wings are aligned with corresponding hole edges of a locking opening, that is to say the butterfly contour of the fastening means and a correspondingly butterfly-form mating locking contour of the add-on part are congruent and the add-on part can thus be raised up. For renewed fitting, it is advantageous if the fastening means is arranged on the carrier component in a manner secured, as before, via the plug-in locking device.

The further advantage of the invention is that the fastening means achieved is straightforward, rattle-free and very reliable and can be removed multiple times.

BRIEF DESCRIPTION OF THE DRAWINGS

The invention will be explained by way of example with reference to a drawing, in which.

DETAILED DESCRIPTION

The fastening means 1 according to the invention has an elongate shank 2, which is of in particular elongate-cylindrical design (FIGS. 1-3, 7, 12, 13). The shank 2 has a plug-in end 3 and a diametrically opposite, drive end 4, which is spaced apart axially from the plug-in end.

The shank 2 forms a lateral wall 5, which forms in particular a cylindrical lateral wall 5.

In particular for facilitating locating a plug-in opening, the plug-in end 3 can be designed with an encircling slope 6, by way of which the lateral wall 5 tapers conically in the direction of the plug-in end 3. The lateral wall 5 has at least one resilient latching element 7 formed in it, adjacent to the encircling slope 6.

The latching element 7 is designed, for example, in the form of an arm or of a button or lug or tongue in a corresponding clearance 8 in the lateral wall 5 and has a base 9, which is present adjacent to the encircling slope 6 and by means of which the latching element 7 is attached to the material of the lateral wall 5, and in particular is formed in one piece therewith. From the base 9, the latching element 7 extends axially into the clearance 8 in the direction of the drive end 4. The latching element 7 extends from the base 9 such that a radially outwardly oriented outer surface 7a of the latching element 7 widens the diameter, as seen in relation to the lateral wall 5, and widens in particular obliquely, continuously obliquely or initially only slightly obliquely outward and then by way of a ramp 10. A rear-engagement latching surface 12 is formed at a snap-fit edge 11 at the location of the greatest amount of radial widening of the latching element 7, or of the ramp 10 of the latter, said latching surface extending radially inward and forming a free 13 of the latching arm 7. The latching element 7 is thus formed in the clearance 8 so as to spring radially around the base 9 and, with the exception of the base 9, is spaced apart from the lateral wall 5 by way of a slot which is formed by the clearance 8.

Figure 12:
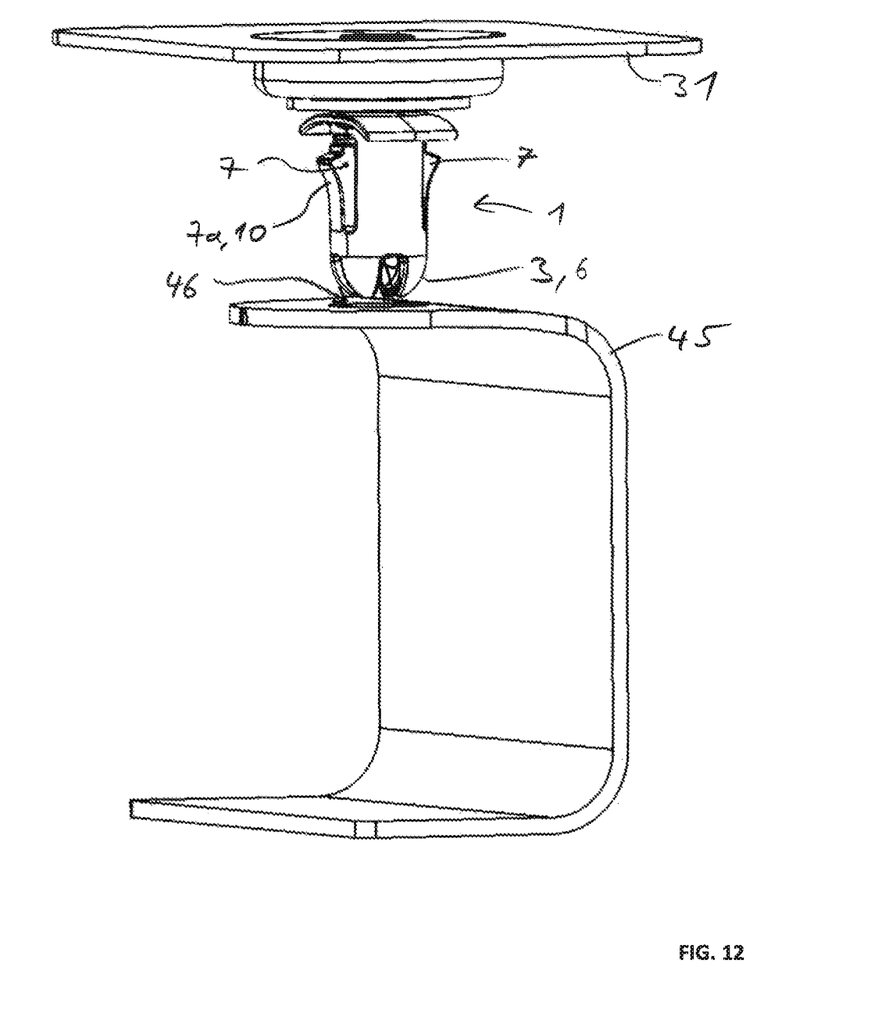
FIG. 12 shows another perspective view of the arrangement from FIG. 11.
Figure 13:
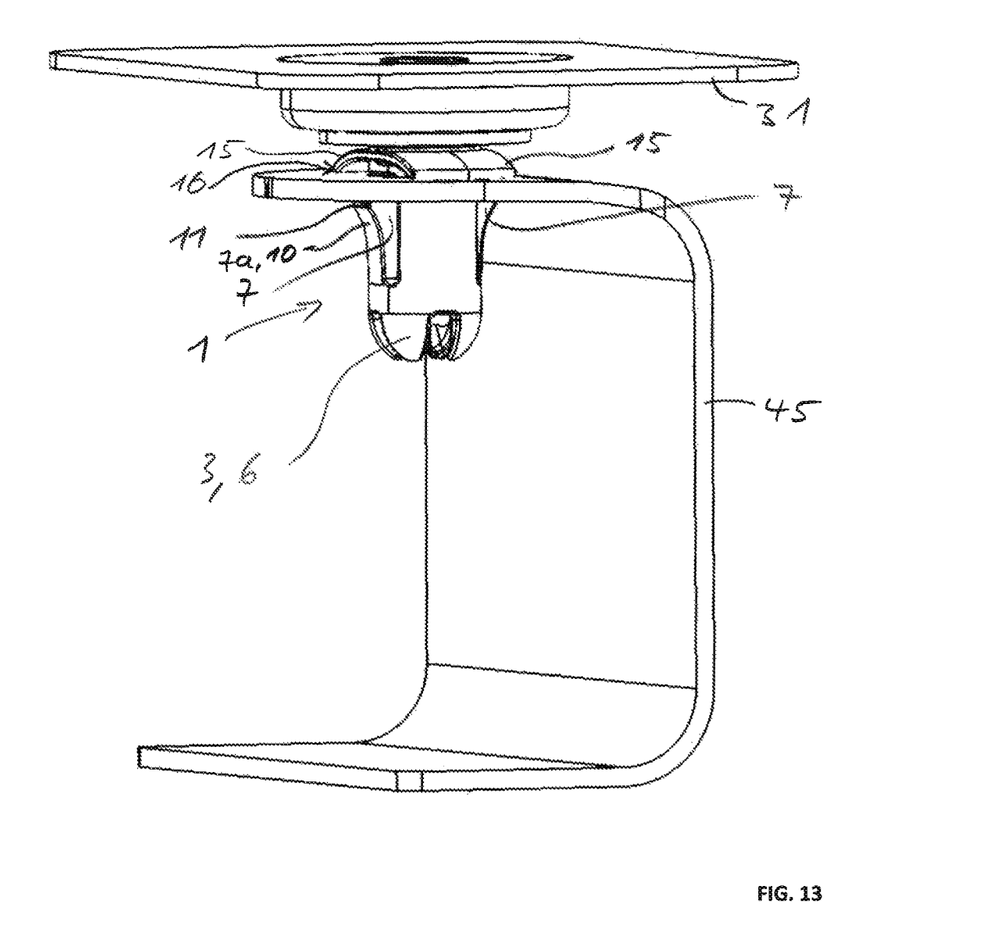
FIG. 13 shows a perspective view of the add-on part fastened on the carrier component by way of the fastening means.

In the case of a preferred embodiment, two clearance 8, each with a latching element 7, are formed diametrically opposite one another in the radial direction, as seen in relation to the circumference of the lateral wall 5 (FIGS. 12 and 13).

An abutment device 14 is arranged on the lateral wall 5, at an axial spacing apart from the latching surface 12.

The abutment device 14 extends radially outward from the lateral wall 5 and its task, when the fastening means 1 is being plugged into a plug-in opening, is to form a plug-in stop on one side and to delimit the opening-containing component, together with the latching surface 12 of a latching element 7, on both sides.

The abutment device 14 can be designed in the form of an encircling projecting edge, of an encircling projecting plate, for example a plate in the shape of a circular disk, or of abutment arms 15 which project only from part of the circumference of the lateral wall 5.

The abutment arm 15 can extend radially outward from the lateral wall 5 to a bearing edge 16, wherein the bearing edge 16 can be designed so as to be inclined, or the abutment arm 15 can be designed so as to be inclined in the direction of the bearing edge 16, in particular inclined in the plug-in direction. In particular, on account of it extending outward and of the properties which are inherent in the material forming the fastening means, in particular a plastic, the abutment arm 15 can be of axially resilient design. As a result of the abutment arm 15 being axially resilient, it is possible, as the fastening means 1 is being plugged in until the point where the abutment arm 15 comes into abutment for the first time, for the fastening means to be plugged in further, counter to a spring force of the abutment arm 15, until the latching surface 12 springs radially outward and engages behind a wall which delimits the plug-in opening. This makes it possible for the fastening means 1 to be retained with a press fit on a carrier component, for example a panel. The latching elements 7 and the abutment device 14 with the abutment arms 15 form a plug-in locking device 17 in the manner of the invention.

In addition, in the case of a design in the form of a circular disk, the bearing edge 16 can be formed with an encircling seal, if desired.

A supporting element 18 is provided axially in the direction of the drive end, at a distance apart from the abutment device 14. The supporting element 18 is, for example, a circular-disk-shaped plate which extends radially outward from the lateral wall 5 to an encircling edge 19. The supporting element 18 thus forms two surfaces, namely a free surface 20 on the plug-in side and an axial locking surface 21 on the drive side.

Locking wings 23 are arranged spaced apart axially in the direction of the drive end 4.

The locking wings 23 extend radially outward, for example in the form of sectors of a circular disk, from the lateral wall 5 to a respective outer edge 24, wherein the outer edge 24 correspondingly follows the radius of the locking wings 23 in the form of sectors of a circular disk. Accordingly, the locking wings 23 widen outward from a base 25 at the shank 2 to the outer edge 24 and, on the plug-in side, have an axial locking surface 30, which is located axially opposite the axial locking surface 21 of the supporting element 18 and is parallel thereto. It should be noted that the assignment of plug-in side to the plug-in end 3 of the fastening means 1 should be understood in relation to a carrier component, even if it is the drive end 4 which is to be plugged into an opening of an add-on part. As will be described later, it is possible for the fastening means 1, together with the pre-fitted add-on part, to be plugged into a hole of the carrier component with the plug-in end 3 in front. Therefore, the assignment of the plug-in side should always be understood in this sense.

In particular if two locking wings 23 are present (FIGS. 1-4), the locking wings 23 with the shank 2 form, in plan view, approximately a butterfly shape or butterfly contour.

The outer edges 24 of the locking wings 23 are aligned axially preferably with the encircling edge 19 of the supporting element 18, and therefore the radial extent of the locking wings corresponds to the radial extent of the supporting element 18.

Along a trailing radial edge of the locking wings—as seen, in particular, in a planned rotating-in direction of the fastening means—the locking wings are connected to the axial locking surface 21 of the supporting element 18 along the radially trailing edge by a continuous crosspiece 26, wherein the crosspiece 26 extends from the lateral wall 5 to the encircling edge 19 of the supporting element 18 and the outer edge 24 of the respective locking wings 23. As far as functionality is concerned, it can also be sufficient if the crosspiece 26 extends only over part of the radial length from the shank 2 to the edges 19, 24.

Figure 6:
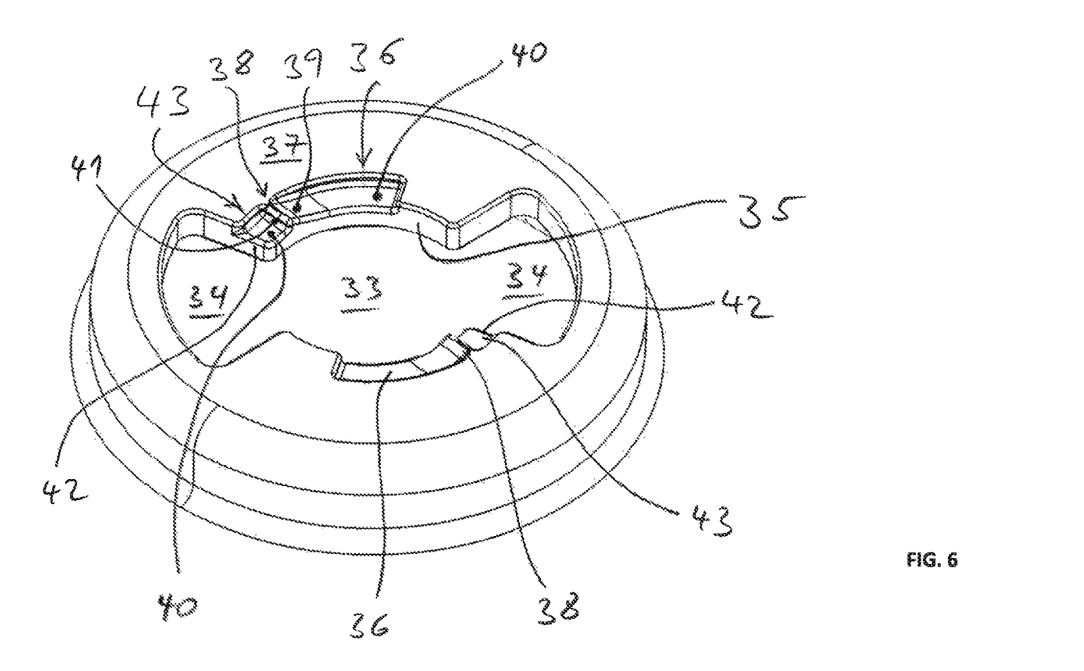
FIG. 6 shows a perspective view from the inside of the locking opening according to FIG. 5.

In addition, an advantageous embodiment of the invention provides a locking contour 28 which interacts with a mating locking contour 36, 43 on an add-on part 31 which is to be fastened, thereby securing a fitted position (FIG. 6).

Figure 2:
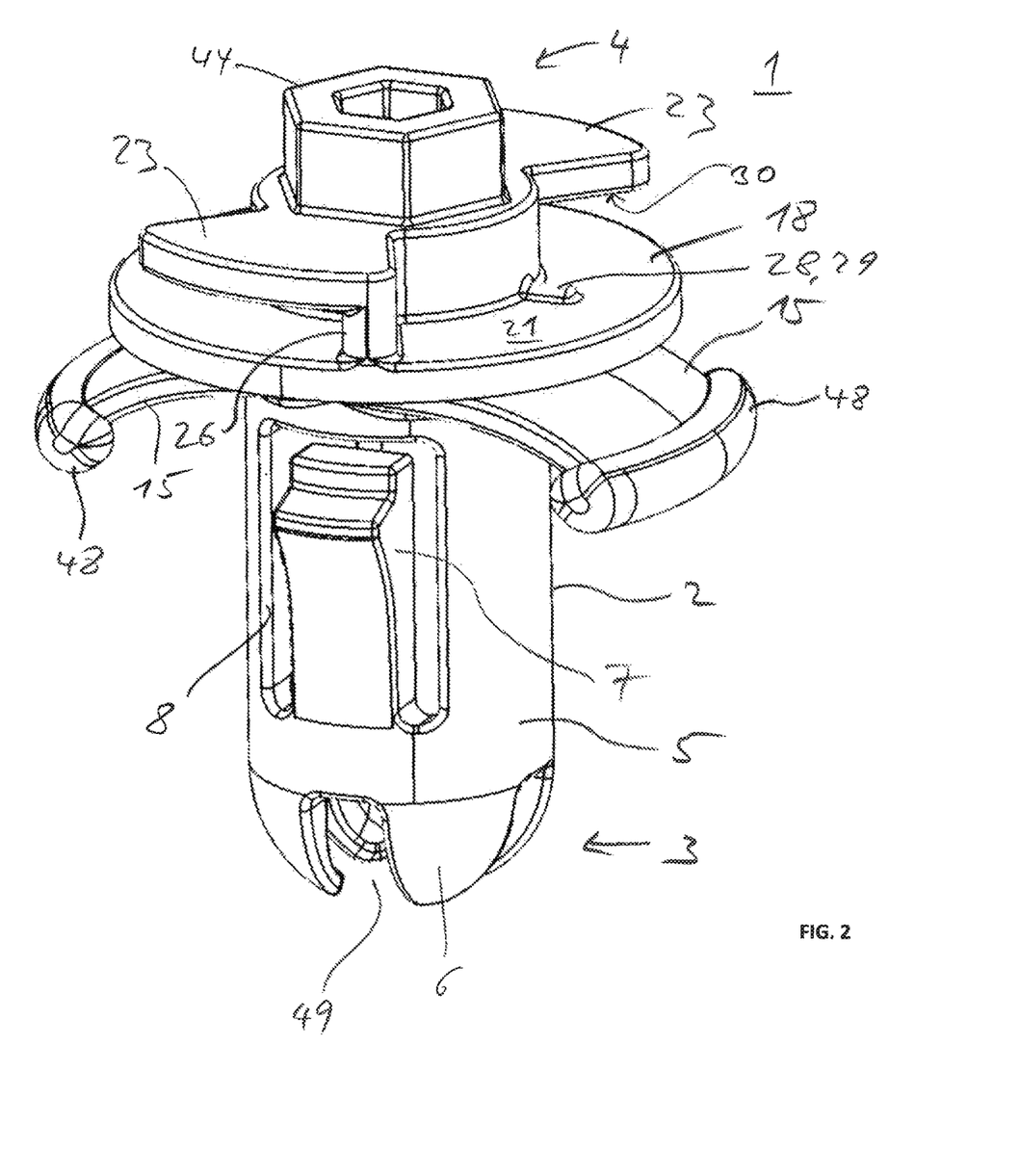
FIG. 2 shows a variant of the fastening means according to FIG. 1.
Figure 3:
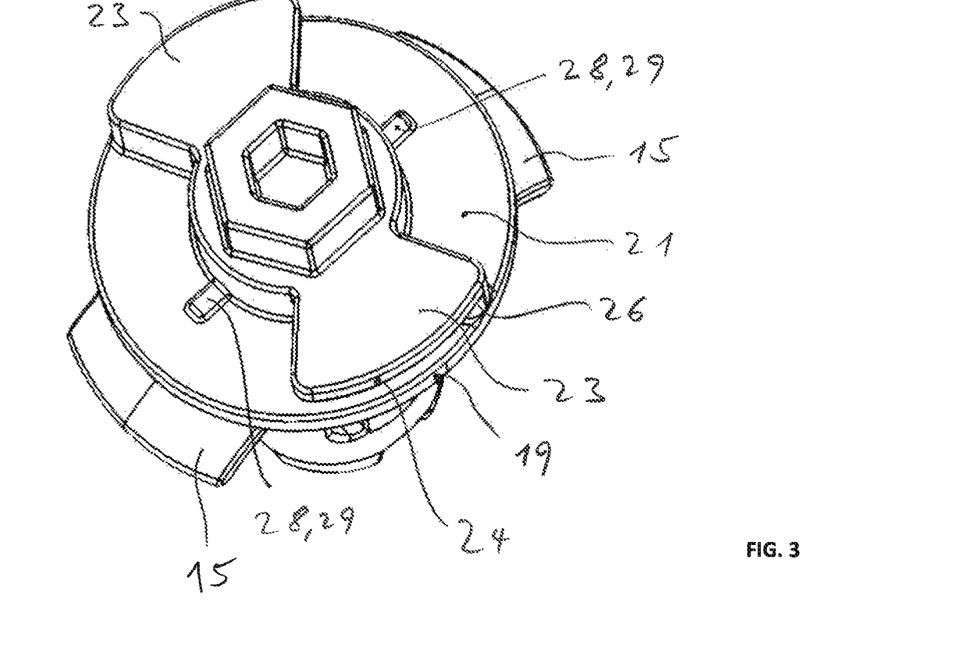
FIG. 3 shows a perspective view from a drive side of the fastening means according to FIG. 1.
Figure 4:
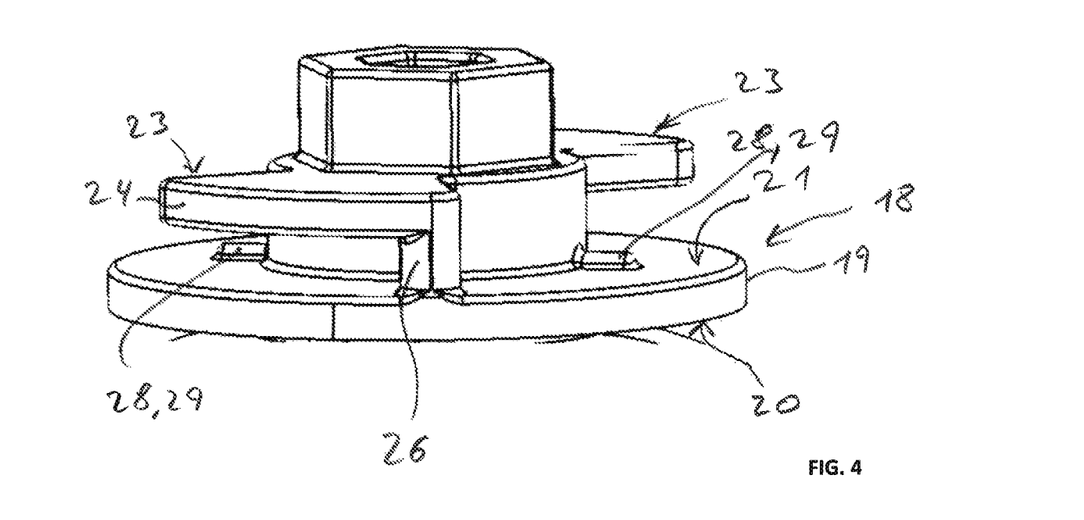
FIG. 4 shows, in detail form, a drive end of the fastening means according to FIG. 1.

If two diametrically extending locking wings 23 are present, a locking contour 28 according to the invention is an elevation 29 which extends radially outward from the lateral wall 5, in particular on the axial locking surface 21, centrally between the locking wings 23 (FIG. 3). The elevation 29 is, for example, a semi-cylindrical structure on the axial locking surface 21 of the carrier element 18 (FIGS. 1-4).

Figure 5:
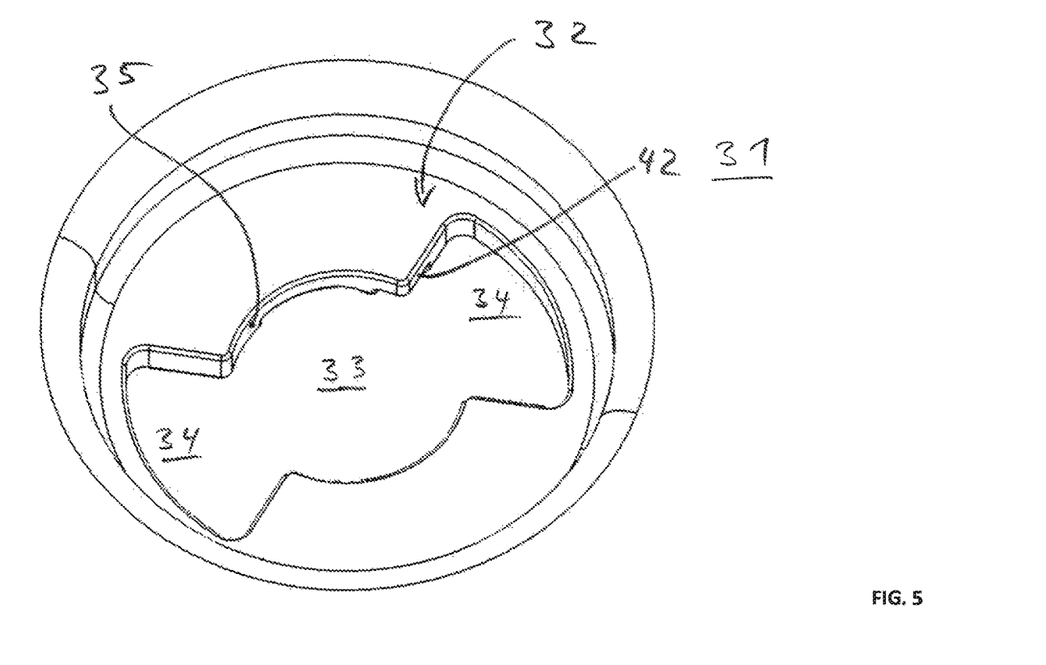
FIG. 5 shows a perspective view from the outside of a locking opening on an add-on part.

A correspondingly designed fitting opening 32 on an add-on part 31 has a butterfly contour which corresponds with the butterfly shape of the locking wings 23 and of the shank 2 and has a central partially cylindrical portion 33 and wing-like widened portions 34 projecting therefrom (FIGS. 5 and 6).

Adjacent to the partially cylindrical portion 33, flat grooves 36 are formed, as mating locking contour, along the delimiting edge 35, and said flat grooves extend from an in particular essentially central region of the delimiting edge 35 between the wing-like widened portions in the direction toward one wing-like widened portion, in particular in the rotating-in direction toward one wing-like widened portion. The flat grooves 36 have a depth, going from an upper surface 37 of the add-on part 31, which corresponds to the height of the elevation 29 of the locking contour 28 of the fastening means 1, in order to be able to accommodate the same.

In addition, the flat grooves 36 contain a ramp-like acclivity 38, which extends away from the groove base 40 by way of a sloping surface 39, which starts at the groove base, and slopes down again to the groove base by way of a steep edge 41. A bearing region 43 for the elevation 29 is formed between the steep edge 41 and an aperture edge 42, by way of which the flat groove 36 opens out into a wing-like widened portion 34 in each case, wherein the elevation 29 is blocked against rotating-out action by the steep edge 41 of the ramp-like acclivity 38.

Extending axially away from the shank 2 and the locking wings 23, an axially projecting drive 44 is provided at the drive end 4 of the fastening means 1, wherein the drive can be, for example, an external hex drive and/or internal hex drive (FIG. 1), although any other kind of internal drive, for example a slot drive, a cross-recess drive, a Pozidriv drive or a Torx drive, is possible.

The fitting and removal operations will be explained hereinbelow.

Figure 7:
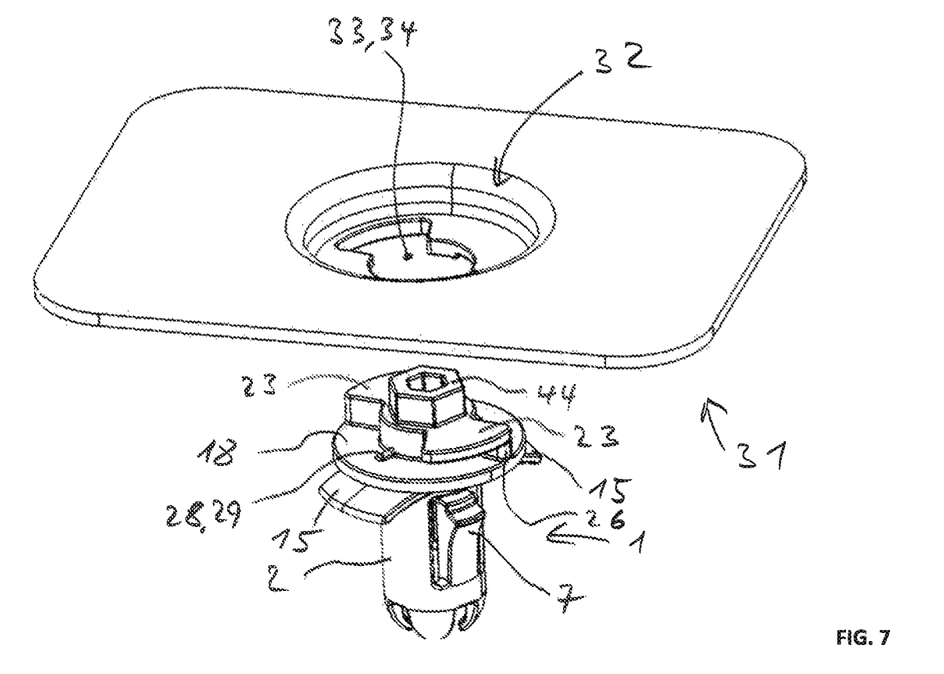
FIG. 7 shows a perspective view of the fastening means according to FIG. 1 with an add-on part which is to be fastened in a state immediately prior to preliminary fitting.
Figure 8:
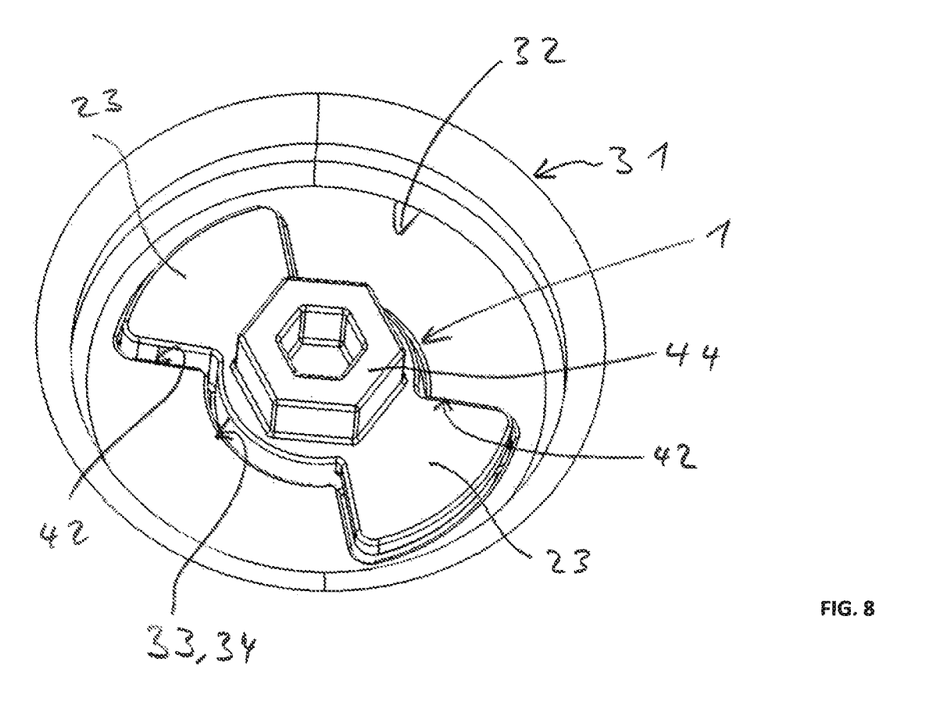
FIG. 8 shows the fastening means according to FIG. 1 in a non-locked state, in which it has been pushed through the locking opening.

For the preliminary fitting of the fastening means 1, the fastening means 1 is plugged into a corresponding fitting opening 32 of an add-on part 31 from a side which is subsequently located opposite a carrier component (FIGS. 7 and 8). In the case of the locking wings 23 and of the shank 2 having the already described butterfly shape, the fitting opening 32 has a corresponding shape, wherein the contour of an edge which delimits said fitting opening 32 corresponds to the outer contour of the shank and of the edges which delimit the locking wings. With the fastening means 1 oriented in the correct position on the fitting opening 32, the fastening means 1 can thus be plugged into the fitting opening 32 with the drive end 4 in front, until the axial locking surface 21 of the supporting element 18 bears against the add-on part 31. In this state, the elevation 29, which serves as a locking contour 28, is located in the flat groove 36, and therefore there is a form fit between the supporting element 18 and the add-on part 31 (FIG. 6).

Figure 9:
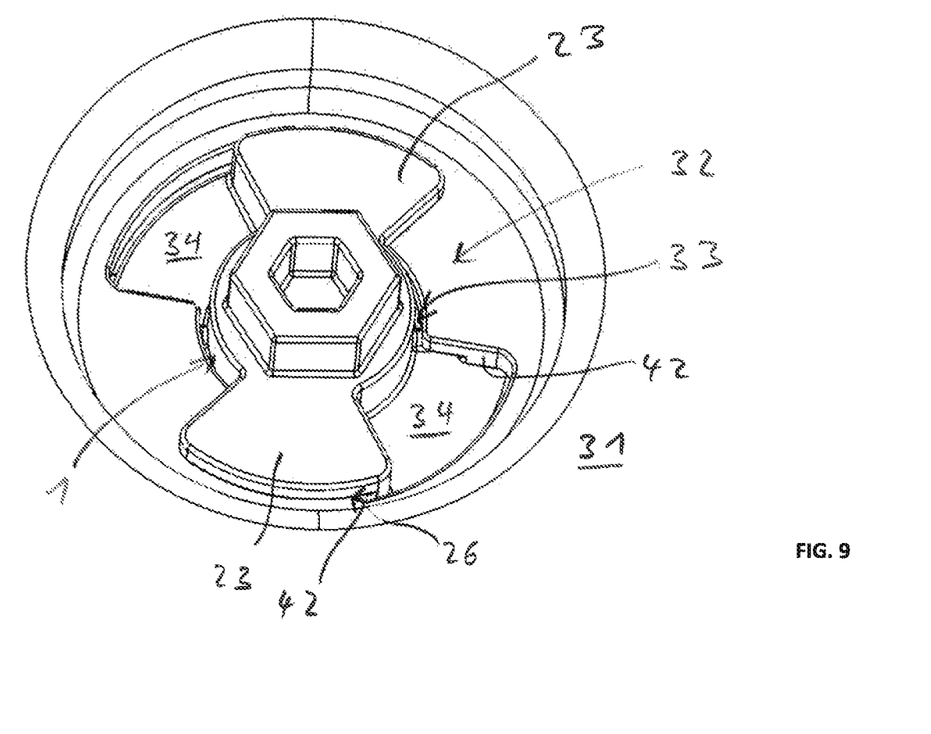
FIG. 9 shows the arrangement according to FIG. 8 in a rotated and locked state.
Figure 10:
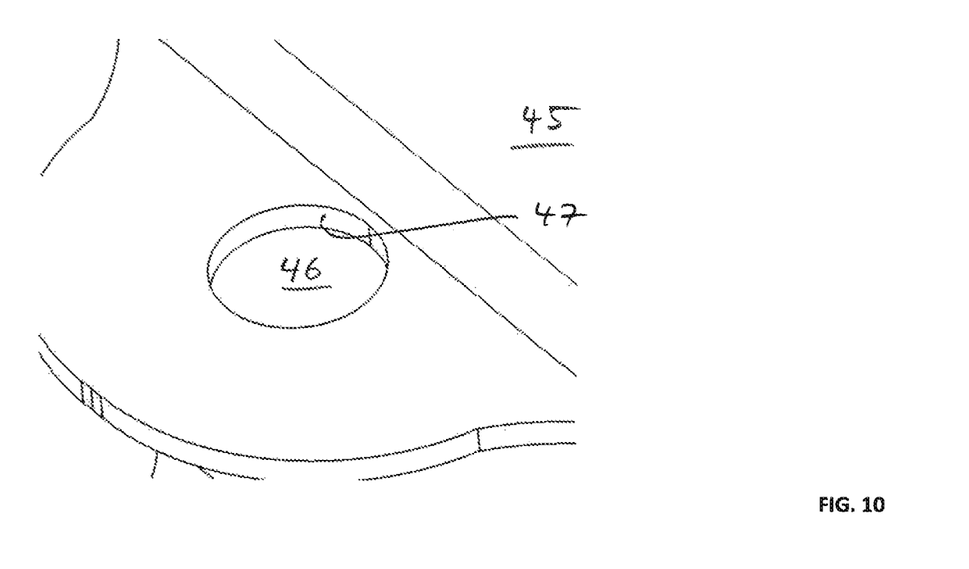
FIG. 10 shows a perspective view of a fastening opening on a carrier component.

The crosspieces 26 on the locking wings 23, or between the locking wings 23 and the supporting element 18 each bear here against an aperture edge 42 of the fitting opening 32. A suitable drive tool is then used to engage in the drive 44, or engage around the latter, and to rotate the fastening means 1. As a result, the locking wings 23 pass out of the region of the fitting opening 32 and end up overlapping the material of the add-on part 31 which is adjacent to the fitting opening 32 (FIG. 9). Rotation is carried out until an edge 42 or aperture edge 42 of the fitting opening 32, located between the carrier plate and locking wings, bears against the inside of the crosspiece 26. The rotating-in movement is terminated as a result. As a result of the rotating operation, in addition, the elevation 29 has also been guided along the groove base 40 in the flat groove 36 and passed, beyond the sloping surface 39 of the ramp-like acclivity 38, into the bearing region 43, and is retained in the bearing region 43 by the steep edge 41 (FIG. 6).

Once a fastening means has, or possibly more than one corresponding fastening means 1 have, been correspondingly arranged on an add-on part 31, for example an aerodynamic cover, the add-on part 31 can be arranged on a carrier, for example a vehicle-body region or a chassis region, by virtue of the fastening means being plugged into corresponding holes.

Figure 11:
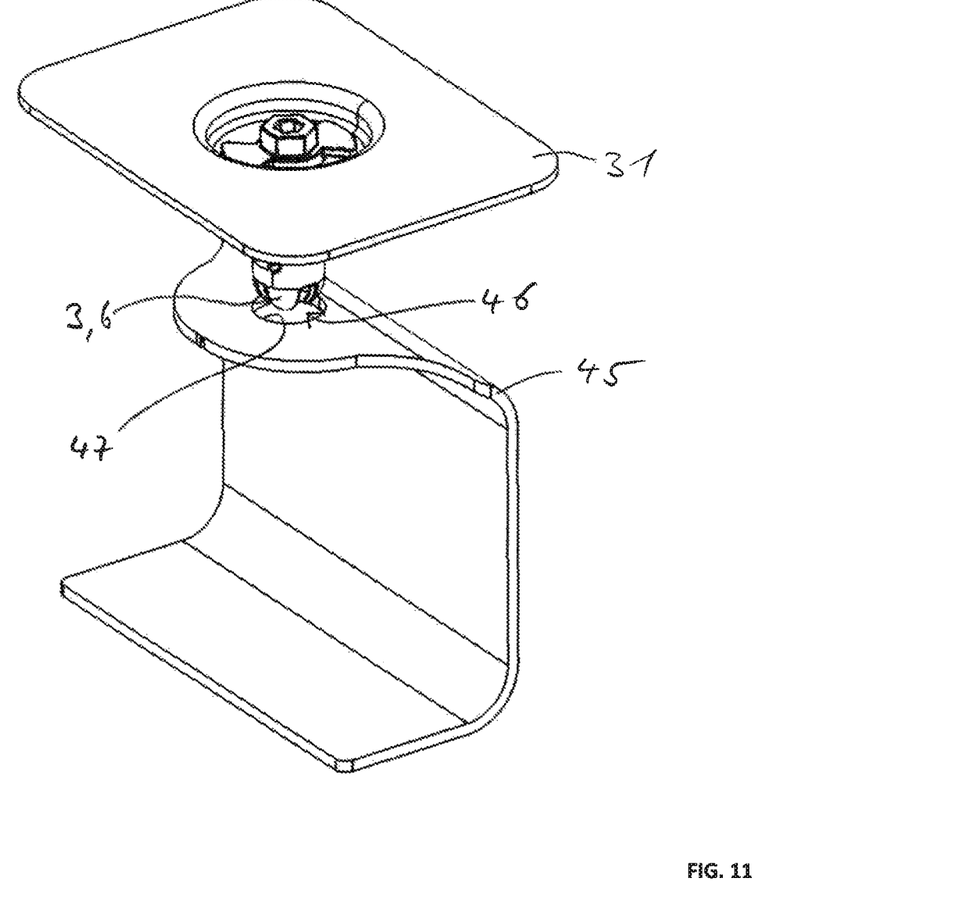
FIG. 11 shows a perspective view of the add-on part with the pre-fitted fastening means according to FIG. 9 along with a carrier component, in a state immediately prior to fitting.

For the purpose of fitting the add-on part 31 on a carrier component 45, the fastening means arranged on the add-on part 31 is or are plugged into a corresponding hole 46 of a carrier component 45 with the plug-in end 3 in front (FIG. 11). During the plug-in operation, the outer surface 7a of the latching elements 7 (FIG. 12) or of the ramps 10 of the latching element 7 come into contact with the encircling edge 47, which delimits the hole 46. Therefore, as the plug-in operation continues, the outer surface 7a of the ramp 10 thereby slides along the encircling hole edge 47, as a result of which the latching element 7 is pivoted radially inward towards the interior of the shank until the snap-fit edge 11 passes into the region of the hole edge 47, as a result of which pivoting is maximized. At the moment at which the snap-fit edge 11 passes out of the region of the encircling hole edge, the latching element 7 springs out, and therefore, once the shank 2 has been plugged through the hole, the latching surface 12 springs outward and bears against the carrier component 45 from beneath and therefore latches in (FIG. 13). It is preferably the case that the carrier component 45 is now bearing, on the upper side, against the abutment device 14 and, in particular, the bearing edge 16 of the abutment arm 15, in which case the fastening means 1 is in contact, preferably pressure-applied contact, with the carrier component 45 from both sides, and therefore the fastening means 1 is arranged on the carrier component 45 in a play-free and rattle-free manner.

Once the fastening means 1 have been plugged into the holes of the carrier component 45, the arrangement of the fastening means 1 on the carrier component 45 also secures the add-on part 31 there. The fastening means 1 can be released again by virtue of the latching elements 7 being pushed together, as long as the overall amount of space available in each case allows access to the latching elements 7.

In order for the add-on part 31 to be released from the carrier component 45, the fastening means 1 are rotated back into the initial fitting state. Therefore, a corresponding drive tool is used to engage in the drive 44 and to return the fitting-stage rotation in the opposite direction. In this case, the elevation 29, which acts as locking contour, is guided out of the bearing region 43, which acts as mating locking contour, via the steep edge 41 of the ramp-like acclivity 38, it being possible, if appropriate, for the material which surrounds the fitting opening 32 to yield elastically.

The locking wings 23 here end up again overlapping with the corresponding butterfly shape 34 of the fitting opening 32, wherein the crosspiece 26 or the crosspieces 26 comes/come into contact again with the aperture edges 42 and thus prevent over-rotation. In other words, the fastening means 1 cannot be rotated to the extent that the locking wings 23 end up again overlapping the wall which delimits the fitting opening 32. In simple terms, all that is required is for the fastening means 1 to be rotated, using a tool, until it comes to a stop in the direction counter to the rotating-in direction. Once all the fastening means 1 of the add-on part 31 have been rotated out accordingly, the add-on part 31 can be raised up from a carrier component 45. In this case, the fastening means 1 remain on the carrier component 45 and are available for renewed fitting of the add-on part 31 or of a spare part.

A respective elastic element 48 can be provided on the abutment arms 15, in the region of the bearing edge 16 (FIG. 2) and, in a fitted state (cf. FIG. 13), said elastic element bears against the upper side of the carrier component 45 and provides for further sound and impact damping. It is possible for the elastic element 48 to be formed in one piece with the abutment arm 15, to be connected thereto in a non-releasable manner, for example molded on, or connected thereto in a releasable manner, for example plugged on.

Figure 1:
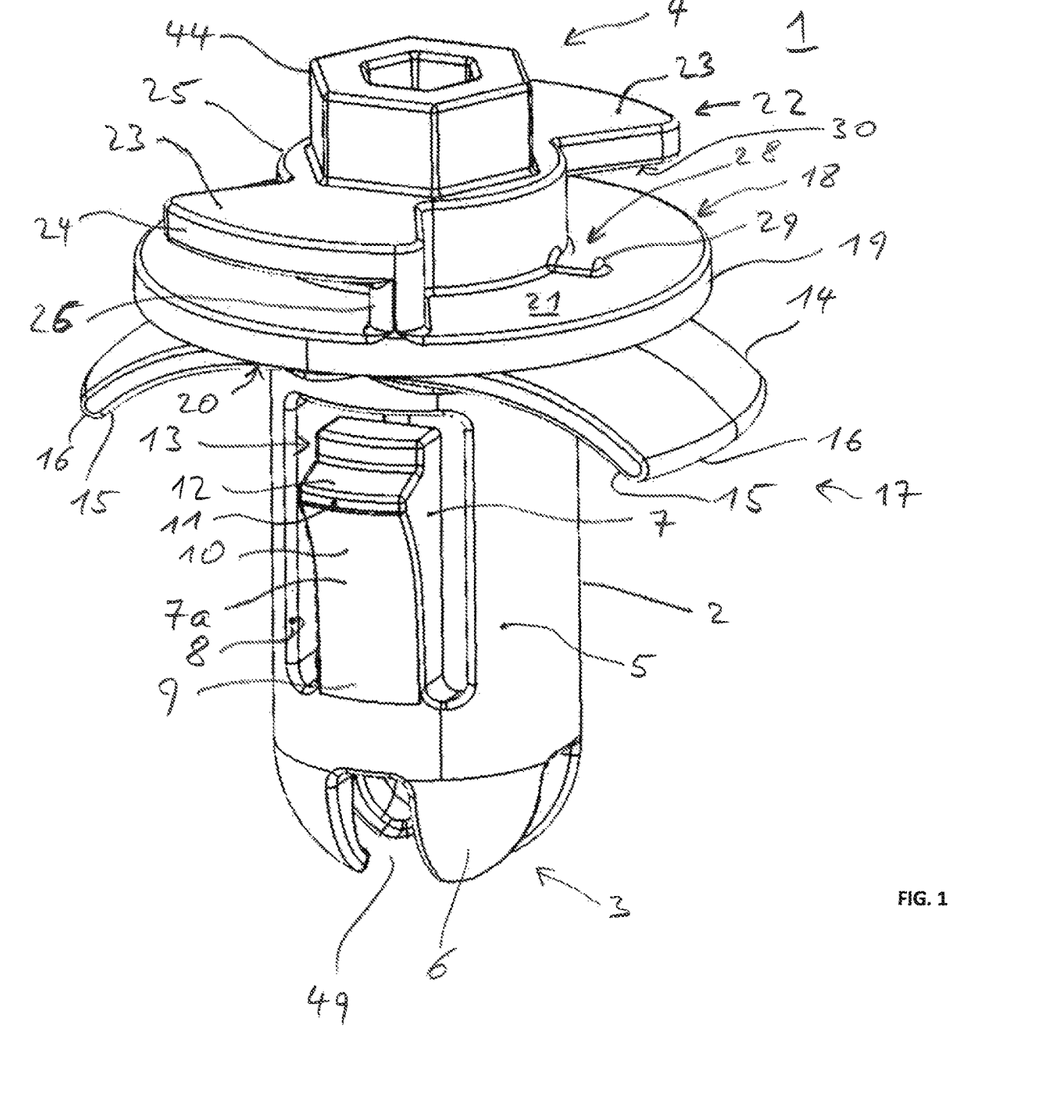
FIG. 1 shows a perspective view of an exemplary embodiment of the fastening means according to the invention.

The slope 6 at the plug-in end 3 of the fastening means 1 can be designed in the form of lugs which are separated from one another by cutouts 49 (FIGS. 1 and 2).

The add-on part 31 is an example of an add-on part in the manner of the invention, and this example does not in any way limit the application area of the invention. The carrier component 45 is an example of a carrier component in the manner of the invention, and this example does not in any way limit the application area of the invention.

The provision according to the invention of a fastening means which has a non-releasable plug-in locking device for a carrier component and a releasable rotary locking device for add-on parts, along with a plug-in locking stop and a rotary locking stop, which delimits the rotating-in and rotating-out action, and a rotary drive, provides a particularly straightforward and robust fastening means which can be operated very easily and, in addition, establishes very secure fastening.

The butterfly shape or butterfly contour gives rise to a very large degree of overlap and therefore a very large locking surface area, which yet further increases the locking and non-tilting properties.

The good preliminary fitting capability according to the invention, in addition, considerably shortens the amount of time required both for preliminary fitting and for definitive fitting.

LIST OF REFERENCE SIGNS

1 Fastening means
2 Shank
3 Plug-in end
4 Drive end
5 Lateral wall
6 Slope
7 Latching element 7a Outer surface
8 Clearance
9 Base
10 Ramp
11 Snap-fit edge
12 Latching surface
13 Free end
14 Abutment device
15 Abutment arm
16 Bearing edge
17 Plug-in locking device
18 Supporting element
19 Encircling edge
20 Surface
21 Axial locking surface
22 Rotary locking device
23 Locking wing
24 Outer edge
25 Base
26 Crosspiece
28 Locking contour
29 Elevation
30 Axial locking surface
31 Add-on part
32 Fitting opening
33 Partially cylindrical portion
34 Wing-like widened portion
35 Delimiting edge
36 Flat groove (mating locking contour)
37 Upper surface
38 Acclivity
39 Sloping surface
40 Groove base
41 Steep edge
42 Aperture edge
43 Bearing region (mating locking contour)
44 Drive
45 Carrier component
46 Hole
47 Hole edge
48 Elastic element
49 Cutout

The invention claimed is:

1. A fastening device for fastening add-on parts on carrier components, wherein the fastening device has a plug-in locking device, for locking to a carrier component, and a releasable rotary locking device, which is spaced apart axially from the plug-in locking device and is intended for locking to an add on part, wherein the rotary locking device has an axial supporting element and at least one locking wing, which is spaced apart axially from the supporting element and extends away radially from an axial shank of the fastening device, wherein the supporting element and the at least one locking wing have axial locking surfaces, which are located axially spaced apart from and opposite one another to define a space therebetween, wherein the axial locking surface of the supporting element is arranged axially between the locking wing and the plug-in locking device, wherein the rotary locking device also has a rotary locking stop, which delimits the rotating-in and/or rotating-out action; wherein the rotary locking stop is a crosspiece that extends (i) radially with respect to the axial shank and (ii) axially from the axial locking surface of the locking wing to the axial locking surface of the supporting element.

2. The fastening device as claimed in claim 1, wherein the rotary locking stop connects the supporting element and the at least one locking wing to one another.

3. The fastening device as claimed in claim 2, wherein the rotary locking stop interacts with the supporting element and the at least one locking wing, providing stiffening action in the process.

4. The fastening device as claimed in claim 1, wherein the crosspiece extends inward from a radially outer edge of the supporting element and/or an outer edge of the at least one locking wing.

5. The fastening device as claimed in claim 1, wherein the at least one locking wing extends away radially from the shank and is in the form of a sector of a circular disc.

6. The fastening device as claimed in claim 1, wherein an outer edge of the at least one locking wing and a radially outer edge of the supporting element are aligned axially with one another.

7. The fastening device as claimed in claim 1, wherein the plug-in locking device has at least one latching element and an abutment device, which is spaced apart axially therefrom.

8. The fastening device as claimed in claim 7, wherein the abutment device has a bearing edge, which is formed on the periphery of at least one axially resilient abutment arm and/or has an elastic element.

9. The fastening device as claimed in claim 8, wherein the at least one latching element is accommodated in an aperture of a lateral wall of the shank and is attached elastically to the lateral wall by way of a base and has a latching surface, which is directed axially toward the abutment device, and a ramp, which is directed axially away from the abutment device, wherein the ramp and the latching surface are connected by a snap-fit edge, which projects outward beyond an outer contour of the lateral wall.

10. The fastening device as claimed in claim 1, wherein a rotary drive is arranged on the shank of the fastening device.

11. The fastening device as claimed in claim 10, wherein, as seen from the supporting element, the at least one locking wing is arranged in the direction of the rotary drive.

12. The fastening device as claimed in claim 1, wherein the shank is of at least partially cylindrical design.

13. The fastening device as claimed in claim 1, wherein the supporting element is designed to encircle the shank in plate form.

14. The fastening device as claimed in claim 1, wherein there is a locking contour, which is designed to interact with a mating locking contour of an add-on part, thereby securing a locked position of the fastening device on the add-on part, wherein the locking contour is a semi-cylindrical or partially cylindrical elevation, which is formed on the axial locking surface of the supporting element or on the axial locking surface of the at least one locking wing.

15. A fastening device for fastening add-on parts on carrier components, wherein the fastening device has a plug-in locking device, for locking to a carrier component, and a releasable rotary locking device, which is spaced apart axially from the plug-in locking device and is intended for locking to an add on part, wherein the rotary locking device has an axial supporting element and at least one locking wing, which is spaced apart axially from the supporting element and extends away radially from an axial shank of the fastening device, wherein the supporting element and the at least one locking wing have axial locking surfaces, which are located axially opposite one another, wherein the axial locking surface of the supporting element is arranged axially between the locking wing and the plug-in locking device, wherein the rotary locking device also has a rotary locking stop, which delimits the rotating-in and/or rotating-out action; further including a locking contour, which is designed to interact with a mating locking contour of an add-on part, thereby securing a locked position of the fastening device on the add-on part, wherein the locking contour is a semi-cylindrical or partially cylindrical elevation, which is formed on the axial locking surface of the supporting element or on the axial locking surface of the at least one locking wing.

\* \* \* \* \*